(12) United States Patent
Trichias et al.

(10) Patent No.: US 9,832,631 B2
(45) Date of Patent: Nov. 28, 2017

(54) PUBLIC SAFETY SYSTEM

(71) Applicants: Koninklijke KPN N.V., The Hague (NL); Nederlandse Organisatie voor Toegepast-Natuurwetenschappelijk Onderzoek TNO, 's-Gravenhage (NL)

(72) Inventors: Konstantinos Trichias, The Hague (NL); Ljupco Jorguseski, Rijswijk (NL)

(73) Assignees: Koninklijke KPN N.V., The Hague (NL); Nederlandse Organisatie voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 0 days.

(21) Appl. No.: 15/023,689

(22) PCT Filed: Sep. 26, 2014

(86) PCT No.: PCT/EP2014/070645
§ 371 (c)(1),
(2) Date: Mar. 22, 2016

(87) PCT Pub. No.: WO2015/044367
PCT Pub. Date: Apr. 2, 2015

(65) Prior Publication Data
US 2016/0212607 A1 Jul. 21, 2016

(30) Foreign Application Priority Data

Sep. 27, 2013 (EP) .................................. 13186479
Jan. 27, 2014 (EP) .................................. 14152673

(51) Int. Cl.
*H04M 11/00* (2006.01)
*H04W 8/00* (2009.01)
(Continued)

(52) U.S. Cl.
CPC ............. *H04W 8/005* (2013.01); *H04W 4/22* (2013.01); *H04W 56/001* (2013.01); *H04W 4/008* (2013.01); *H04W 76/023* (2013.01)

(58) Field of Classification Search
CPC ..... H04W 8/005; H04W 4/22; H04W 56/001; H04W 4/008; H04W 76/023
See application file for complete search history.

(56) References Cited

U.S. PATENT DOCUMENTS 8,432,920 B2 4/2013 Yee et al.
8,488,496 B2 7/2013 Kubo et al.
(Continued)

FOREIGN PATENT DOCUMENTS

JP 2010068127 A 3/2010
WO 00/42737 A1 7/2000
(Continued)

OTHER PUBLICATIONS

International Search Authority, International Preliminary Report on Patentability for PCT Pat. App. No. PCT/EP2014/070645, dated Mar. 29, 2016.
(Continued)

*Primary Examiner* — Ajit Patel
(74) *Attorney, Agent, or Firm* — McDonnell Boehnen Hulbert & Berghoff LLP

(57) ABSTRACT

The disclosure relates to a method for discovery by a non-discoverable first public safety user equipment (PS UE), of a discoverable second PS UE in a public safety system comprising a telecommunications network providing a public safety spectrum for wireless access of the first PS UE and the second PS UE. The method can comprise for the first non-discoverable PS UE: transmitting synchronization information for the second PS UE; receiving at least one proximity announcement from the second PS UE in accor- (Continued)

dance with the transmitted synchronization information. The disclosure also relates to a non-discoverable public safety user device configured for performing the method, and relates to a PS server system arranged for assisting in the discovery of PS UEs.

12 Claims, 11 Drawing Sheets

(51) Int. Cl.
*H04W 4/22* (2009.01)
*H04W 56/00* (2009.01)
*H04W 76/02* (2009.01)
*H04W 4/00* (2009.01)

(56) References Cited

U.S. PATENT DOCUMENTS

| | | | |
|---|---|---|---|
| 2008/0075145 A1 | 3/2008 | Balachandran et al. | |
| 2010/0167743 A1 | 7/2010 | Palanki et al. | |
| 2011/0292862 A1 | 12/2011 | Shimizu | |
| 2013/0182631 A1* | 7/2013 | Jamadagni | H04B 7/15592 370/312 |
| 2013/0287012 A1 | 10/2013 | Pragada et al. | |
| 2014/0004796 A1 | 1/2014 | Cakulev et al. | |
| 2014/0056220 A1* | 2/2014 | Poitau | H04W 40/246 370/328 |
| 2014/0057637 A1 | 2/2014 | Hoang et al. | |
| 2015/0156757 A1* | 6/2015 | Kalhan | H04L 1/1607 370/330 |
| 2015/0181546 A1* | 6/2015 | Freda | H04W 56/0015 370/336 |
| 2015/0304149 A1* | 10/2015 | Kim | H04W 56/00 375/260 |
| 2016/0073392 A1* | 3/2016 | Byun | H04W 72/048 370/280 |

FOREIGN PATENT DOCUMENTS

| | | |
|---|---|---|
| WO | 2008/036129 A1 | 3/2008 |
| WO | 2012/118451 A1 | 9/2012 |

OTHER PUBLICATIONS

Qualcomm Incorporated,"Techniques for Synchronization", 3GPP Draft, R1-133598_Qualcomm_D2D_Synchronization, 3rd Generation Partnership Project (3GPP), Aug. 9, 2013.
G. Gabor et al., "Design Aspects of Network Assisted Device-to-Device Communications", IEEE Communications Magazine, Mar. 2012, vol. 50, No. 3, pp. 1-8.
Eads,"Public Safety Usage and Impacts on Synchronization",3GPP Draft R1-135402, 3rd Generation Partnership Project (3GPP), Nov. 1, 2013.
European Patent Office, Partial European Search Report for EP Pat. App. No. 14152673.1, dated Jun. 14, 2014.
Intel Corporation,"On D2D Discovery Transmission Timing", 3GPP Draft R1-135955-Intel-Disocverty-Transmission Timing, 3rd Generation Partnership Project (3GPP), Nov. 11, 2013.
International Search Authority, International Search Report for PCT Pat. App. No. PCT/EP2014/070645, dated Dec. 12, 2014.
International Search Authority, Written Opinion of the International Searching Authority for PCT Pat. App. No. PCT/EP2014/070645, dated Apr. 2, 2015.
Qualcomm Incorporated,"Techniques for D2D Discovery", 3GPP Draft, R1-133600_Qualcomm_D2D_Discovery, 3rd Generation Partnership Project (3GPP), Aug. 10, 2013.
Third Generation Partnership Project, "Technical Specification Group SA; Feasibility Study for Proximity Services (ProSe) (Release 12)", 3GPP Standard; 3GPP TR 22.803 Sep. 12, 2012.
Catt, "Solution of WLAN direct communication", Sep. 18, 2013, 3GPP TSP-SA WG2 Meeting #99, available via the Internet at www.3gpp.org/ftp/tsg_sa/WG2_Arch/TSGS2_99_Xiamen/Docs/S2-133441.zip (last visited Jul. 6, 2017).
LG Electronics,"Device Discovery Outside and Partial Network Coverage", May 11, 2013, 3GPP TSG RAN WG1 Meeting #73, available via the Internet at www.3gpp.org/ftp/tsg_ran/WG1_RL1/TSGR1_73/Docs/R1-132249.zip (last visited Jul. 6, 2017).

* cited by examiner

PUBLIC SAFETY SYSTEM

CROSS REFERENCE TO RELATED APPLICATIONS

The present application is a U.S. national stage entry of, and claims priority to, PCT/EP2014/070645, filed on Sep. 26, 2014, which claims priority to both European Patent Application EP 13186479.5, filed in the European Patent Office on Sep. 27, 2013 and European Patent Application EP 14152673.1, filed in the European Patent Office on Jan. 27, 2014, all of which are hereby incorporated in their entirety herein by reference for all reasons.

FIELD OF THE INVENTION

The invention relates to a public safety system. In particular, the invention relates to a discovery method in such a system for a non-discoverable device, to a public safety server system and to a public safety user device.

BACKGROUND

In the United States, LTE has been selected by the FCC as the technology for the Public Safety Network. In Europe, there is an ongoing discussion on the spectrum to be chosen for broadband Public Safety held by CEPT ECC WG FM PT 49. Additionally, a variety of public safety over Proximity Service (ProSe) requirements have been defined in 3GPP TR 22.803 v1.0.0 (2012-08) Technical Specification Group SA; Feasibility Study for Proximity Services (Release 12).

A public safety UE (PS UE) can operate in the public safety spectrum for public safety service and in the Mobile Network Operator (MNO) commercial spectrum for commercial services. However, only the public safety spectrum is used for public safety ProSe.

PS UEs using ProSe, communicate with each other using the Public Safety spectrum, even though they might be served by different HPLMNs. It must be noted here, that it is assumed that PS UEs may operate as commercial UEs utilizing the commercial spectrum belonging to one of the available operators, but when they operate in Public Safety mode they utilize a predefined, non-commercial, common Public Safety spectrum, that is reserved exclusively for PS UE communication.

PS UEs may either work within network coverage or outside network coverage while in both cases utilizing the public safety spectrum for the public safety services. When working outside network coverage, the PS UE cannot receive information from the network or use it for communication with other PS UEs.

A public safety UE can automatically use ProSe when network coverage is not available, or the user can manually set the UE to use ProSe discovery and communication even when network coverage is available.

In order to discover another PS UE, the PS UE listens on the radio interface at a specific time and frequency when and where other PS UEs will transmit their identities. Such identities are transmitted as proximity announcements (PAs). The PS UEs synchronize when to receive and transmit proximity announcements.

For PS UEs that are in network coverage, the network can convey synchronization information to the PS UEs. But this does not help for PS UEs that are not in network coverage. PS UEs that are outside network coverage can broadcast synchronization information themselves.

PS UEs may be set to be non-discoverable. Non-discoverable PS UEs should not transmit their identities, i.e. should not send PAs.

Assume a multitude of public safety officers (e.g. police officers, firemen, etc.) responding to an emergency situation. All the officers are equipped with PS enabled UEs. The officers must be able to discover and communicate with each other using their PS UEs, even if they are situated outside of network coverage. Even if an officer has set his/her UE to be non-discoverable from other PS UEs, he must still be able to discover the other PS UEs in vicinity.

The problem is now how to ensure that the PS UEs get synchronized when non-discoverable PS UE's are involved.

SUMMARY

The present disclosure presents a method to obtain synchronization when non-discoverable PS UEs are involved. The appended claims constitute aspects of this system and method.

Furthermore, the disclosure relates to aspects of such a PS UE.

By transmitting the synchronization information (and possibly an indication of the freshness of the synchronization information), a non-discoverable public safety UE does not need to identify itself while enabling other devices to synchronize to the non-discoverable PS UE and transmit PAs that may then be received by the non-discoverable PS UE. In this manner, the non-discoverable device is not discovered and enabled to discover other PS UEs.

Still further, and in a separate aspect of the present disclosure, a public safety server is presented comprising information enabling the discovery method.

It is noted that the invention relates to all possible combinations of features recited in the claims.

It has been recognised that the invention can also advantageously be used in other scenarios than public safety, in particular for Proximity Services (ProSe) in non-public safety scenarios. In this disclosure, if ProSe is read instead of public safety, e.g. ProSe UE instead of PS UE etc., the invention can be applied to ProSe in general. For example, separate ProSe spectrum can be used for transmitting synchronization information in and out of network coverage. Especially if a ProSe device is out-of-coverage and out-of-coverage discovery is to be supported, the presented methods for discovery by a non-discoverable UE can be used to advantage.

As another example, the presented server system can be used to define other groups than public safety groups, e.g. a group of employees from a company, or a social group. Also, when the first and second UE belong to different network operators, a ProSe server system connected to the different networks can be used to advantage to define groups of UE's not limited to one network operator.

BRIEF DESCRIPTION OF THE DRAWINGS

Aspects of the invention will be explained in greater detail by reference to exemplary embodiments shown in the drawings, in which.

DETAILED DESCRIPTION OF THE DRAWINGS

An embodiment is disclosed for ProSe discovery in Public Safety enabled UEs (PS UEs) which are in or out of network coverage of the public safety spectrum. The invention may or may not belong to different PLMNs. The PS UE's may operate in discoverable or non-discoverable mode.

The system described below makes use, inter alia, of the following concepts. Each of these concepts may be applied in isolation or in combination with one or more of the other concepts.

A PS UE that retransmits synchronization information to other UEs that are not in network coverage, when at cell edge, or sends its own synchronization information when out of coverage.

A PS UE that transmits sync info when it does not receive Proximity Announcements (PAs) for a specific time (if PAs are received, synchronization should be OK).

A Universal PS Clock synchronization signal that is coordinated between different network operators if the PS UEs belong to different PLMNs. Each network operator may e.g. transmit the offset with its own SFN (System Frame Number) and synchronization clock to UEs.

A Public Safety (PS) Registry Server is applied. The PS server contains particular information that may be applied for synchronization of the PS UEs in a variety of situations.

Figure 1:
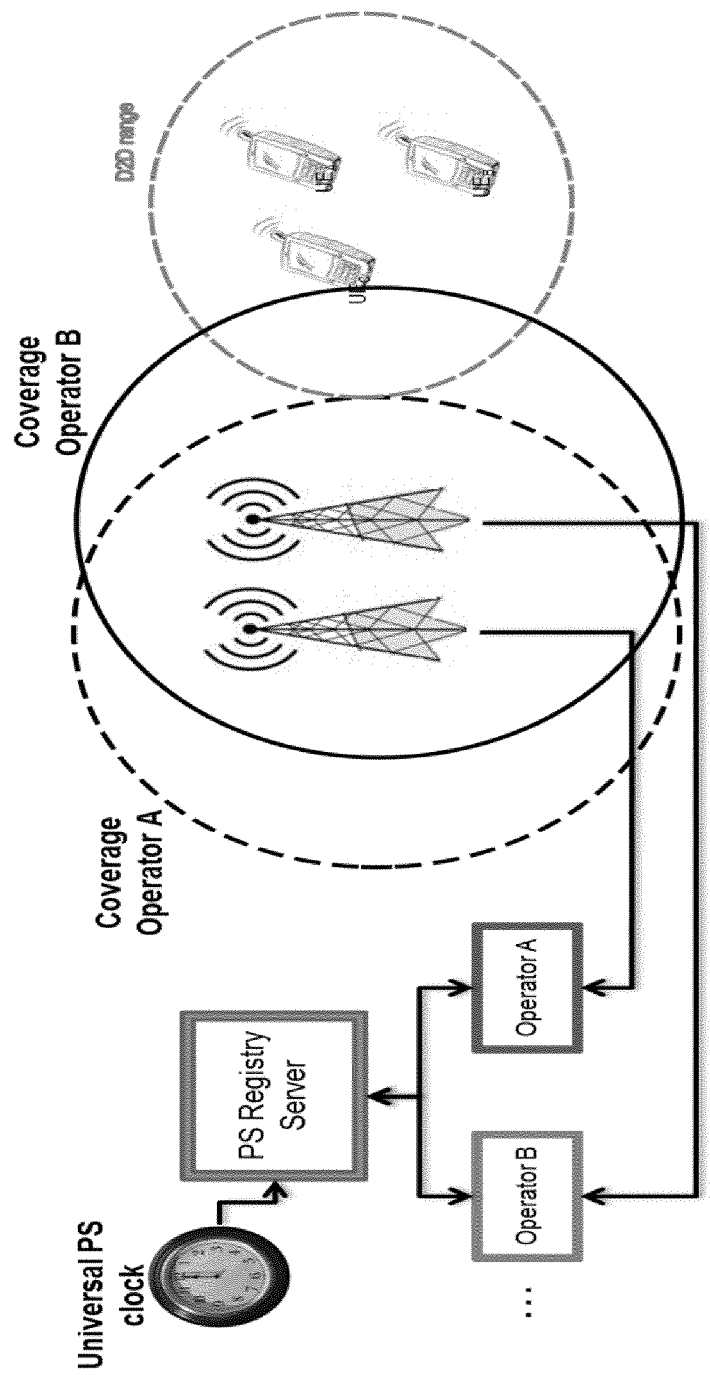
FIG. 1 is a schematic illustration of a system architecture when PS UEs of different PLMNs are involved.

FIG. 1 shows a schematic illustration of a system architecture when PS UEs of different PLMNs are involved. It should be noted that the disclosure also relates to systems and method involving PS UEs of only a single PLMN.

The system of FIG. 1 comprises four main components.
1) PS server which contains public safety related functionality of the network.
2) A Universal Public Safety Clock (UPSC) which provides a common time reference for all PS enabled UEs across different PLMNs.
3) A set of associated mobile network operators and their corresponding domains (radio and core) that have bidirectional communication with the PS registry.
4) A set of PS enabled UEs, which can be located within or out of network coverage of the public safety spectrum and which exchange information with the PS server, periodically or triggered by specific events, through the currently serving operator.

Figure 2:
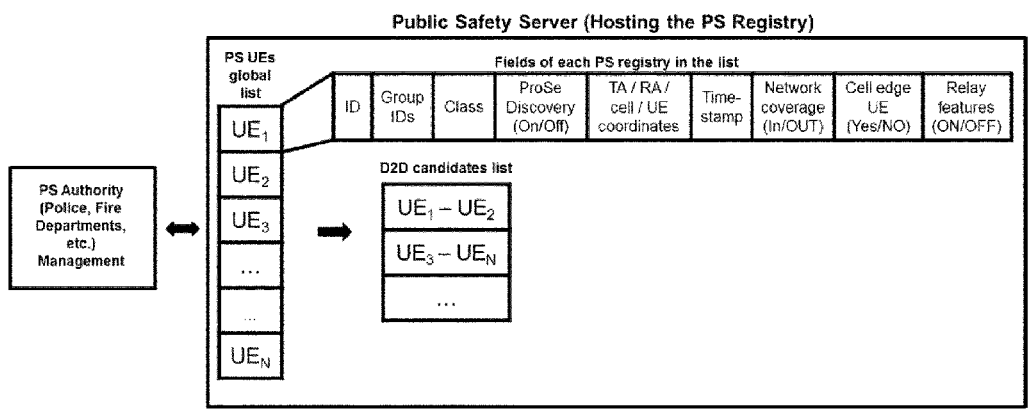
FIG. 2 is a schematic illustration of a PS server containing a registry with fields applied in the present disclosure.

FIG. 2 is a schematic illustration of an embodiment of a PS server. Again, the PS server may also be applied for PS UEs from a single PLMN. Through the PS server, every single PS authority (e.g. police, fire department, etc.) can interact directly with the PS wireless communication system via either a standardized or proprietary management interface (see left side in FIG. 2). In this way the PS authorities can provide information to the PS server, request information from the system, trigger certain actions or be alerted by certain events.

The Global PS UEs List (GPUL) is a list containing information about every single one of the activated PS enabled UEs, across all operators networks (if more than one operator network is used). Since the PS server may be in constant bidirectional communication with all the operators, the GPUL may remain updated based on e.g. the algorithm presented below.

The D2D candidate list is a list that is created either periodically or triggered by specific events and which contains possible candidate UEs for direct communication. This list is created based on UE location information from the GPUL.

Each entry in the GPUL represents a PS enabled UE, which can be served/subscribed to any of the associated mobile network operators, and is comprised of multiple fields containing information about that specific PS UE. The fields of the PS server registry are shown in more detail in FIG. 2.

ID field: This field holds a unique ID number which identifies a specific PS enabled UE. This field is configured by the PS authority that has configuration access to the PS server via a standardized or proprietary management interface.

Group IDs field: This field holds the ID numbers of the Groups that this specific UE belongs to (used for ProSe group communications—multicasting/broadcasting). This field is configured by the PS authority that has configuration access to the PS services server via a standardized or proprietary management interface.

Class field: This field identifies the capabilities of the specific PS UE and offers the possibility for differentiation of services between different PS UEs (differentiation between officers, group leaders, commanders, etc.). This field is configured by the PS authority that has configuration access to the PS services server via a standardized or proprietary management interface.

ProSe Discovery field: This field contains a value indicating the setting of the discoverable mode of the UE. It can be set to ON (UE can be discovered by all other PS UEs), OFF (UE cannot be discovered by any other UE) or contain a set of IDs and or class identifiers that will allow only a specific sub-set of the PS UEs to be able to discover this particular UE (e.g. be discoverable only by a specific set of UEs or class of PS UEs). This field may be configured by the PS authority that has configuration access to the PS services server via a standardized or proprietary management interface.

TA/RA/(Enhanced) cell ID/UE coordinates field: This field contains information about the latest Tracking Area (TA), Routing Area (RA), (Enhanced) cell ID, or UE coordinates (if UE is e.g. GPS enabled and its coordinates can be determined) that the specific PS UE is/was seen. The information for this field is provided by the LoCation Services (LCS) functions from the respective mobile network(s) serving the PS enabled UE as explained in TS 23.721 v11.2.0 "Functional stage 2 description of Location Services (LCS) (Release 11)" and with the type of location information as provided by the respective positioning method (e.g. TA, RA, (Enhanced) Cell ID, observed time difference of arrival, assisted—GPS, etc.) as explained in TS 25.305 v11.0.0 "Stage 2 functional description of User Equipment (UE) positioning in UTRAN (Release 11)".

Timestamp field: This field contains the time that the TA/RA/(Enhanced) cell ID/UE Coordinates field was last updated as provided by the universal PS clock (either for multiple networks or for a single network).

Network Coverage field: This field contains information about whether the specific PS UE is currently in or out of network coverage as provided by the EPC (Evolved Packet Core) of the associated mobile networks.

Cell edge UE: This field contains an indicator which shows whether the UE is near the cell edge. The decision may be based on the Reference Signal Received Power (RSRP) of the UE. If a certain condition is full-filled, such as $RSRP_{UE} \leq RSRP_{CellEdge}$, then the UE is marked as a cell edge UE in the GPUL as provided by the EPC of the associated mobile networks.

Relay Feature field: This field contains information about whether the relay feature of the specific PS UE is activated or not (used for relaying synchronization information among PS enabled UEs) as e.g. configured by the PS authority that has configuration access to the PS services server via a standardized or proprietary management interface The information contained in the fields of the GPUL leads to knowledge of all the PS UEs and their locations. In case the PS server serves networks of multiple operators, the information is independent of which operator the UE belongs to. At system start-up, the PS registry collects all these information, if necessary from the different operators which, in turn are informed from the PS server about which UEs in their domain are PS enabled UEs.

It should be noted that each of the above-defined fields represents an individual aspect of the present disclosure and is not necessary linked to other fields in the GPUL.

Figure 3:
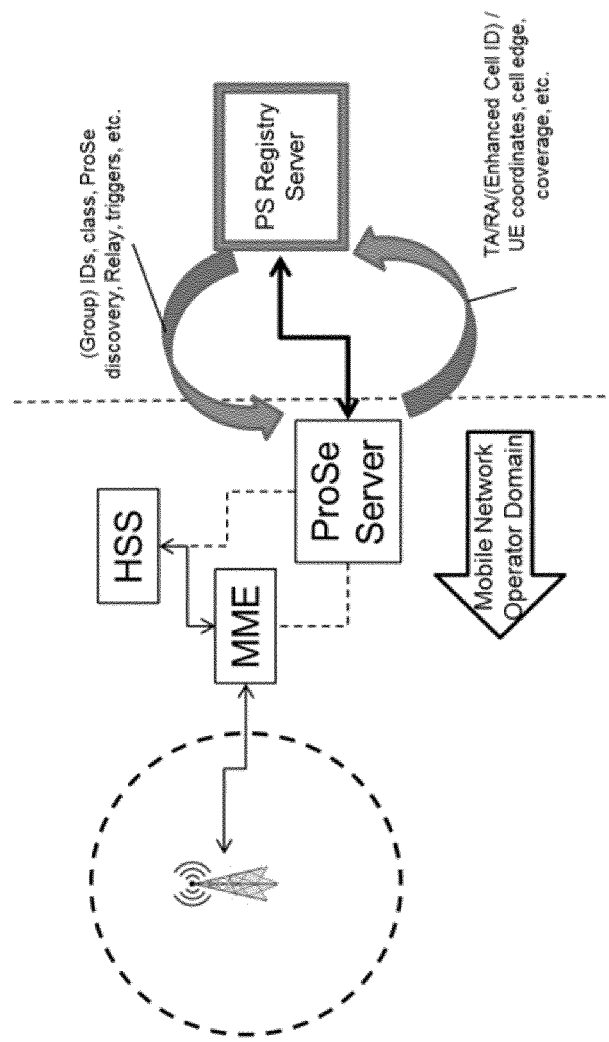
FIG. 3 is a schematic illustration of an example of a location of a PS server in a telecommunications network.

The PS server can be considered an application server located:

a) Behind the associated mobile network operator domains as illustrated in FIG. 3 and interfacing with the ProSe server of the associated mobile network operators. Note that the ProSe server of the mobile network operators provides for proximity discovery and establishing device to device connections for commercial UEs (i.e. non-PS enabled UEs).

b) Within the EPC and more specifically it can be placed next to or as part of mobile network operator's ProSe server (this option is not illustrated in FIG. 3 for clarity reasons).

The PS server may be provided with the following information to keep its content up to date:

a) Location of the PS UE, can be provided to the PS server by the MME or via the ProSe server with the use of Packet Data Units (PDUs) by means of Non-Access Stratum signaling between the PS server and the MME/ProSe. This may be a standardized interface.

b) Additional information, such as UE ID, group, class, relay capability or the discoverable configuration of the UE, can be communicated to the PS server directly from the UE with the establishment of an EPS bearer between the UE and the EPC.

c) Additionally, some of the PS registry fields, such as cell edge information or network coverage, can be filled by information acquired through signaling between the eNB (evolved NodeB) via the EPC and the PS registry server. This may be a standardized interface.

The ProSe Discovery and Communication between PS enabled UEs will take place in a dedicated spectrum, which is reserved for Public Safety purposes (the public safety spectrum), thus leaving the operator allocated spectrum unaffected. The UEs within an operator's network may be synchronized based on the operator's internal clock, through the broadcast of the system frame number (SFN) in the Master Information Block (MIB) and the primary and secondary synchronization channels (P-SCH and S-SCH). The different base stations are synchronized between each other via different methods, such as using Global Navigation Satellite Systems (GNSS), using the backhaul network and e.g. IEEE1588v2+SyncE protocols, etc.

Regardless of the operator that a PS UE belongs to, all PS enabled UEs may maintain a second synchronization (apart of the one with the operator) with the PS server, based on the UPSC. This may achieve synchronization among PS enabled UEs, regardless of which operator they belong to. Each associated operator network can retrieve from the PS server the SFN and synchronization clock and derive the corresponding offset with its own SFN and sync clock. This offset can be signaled to the PS enabled UEs when these UEs perform discovery and D2D connection set-up with other PS enabled UEs in the dedicated spectrum for PS services.

Figure 4:
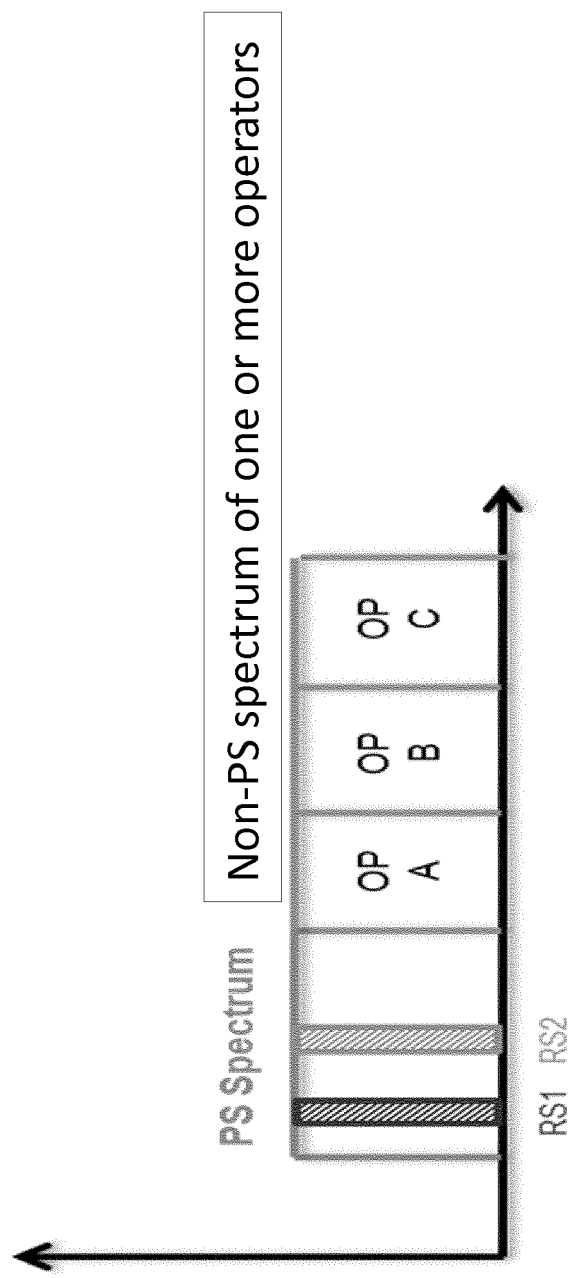
FIG. 4 is a schematic illustration of an example of a PS spectrum in combination with non-PS spectra of multiple operators.

FIG. 4 is a schematic illustration of a frequency spectrum used for commercial operation (non-PS spectrum) and for the PS service (PS spectrum). The PS spectrum is a specially reserved spectrum for PS services that may be common to a plurality of operators.

ProSe discovery and communication may take place over a specially reserved spectrum for public safety purposes. Two very small frequency bands, within the PS spectrum, are reserved for special purposes, as illustrated in FIG. 4.

Reserved spectrum band RS 1 is exclusively used for the transmission or retransmission (relaying) of synchronization information, preferably in the form of sync packets, containing UPSC synchronization information. The PS enabled UEs that receive this sync packet will be able to synchronize among themselves or with the PS server. Apart from UPSC synchronization information, the sync packets transmitted by the UEs may also contain a counter which will indicate the elapsed time since the last contact of the PS UE with the PS server (and thus the Universal clock). This counter may be used to break the "tie" between two UEs that are both out of network coverage and have lost synchronization with the UPSC but are within D2D distance of each other, by allowing the UEs to synchronize among themselves by using the timing of the most recently updated UE. When a UE is within network coverage this counter will be set to zero. The functionality of this counter is further explained below. The transmission of the sync signals can be performed in a similar way as it is done with e.g. P-SCH and S-SCH in LTE. Instead of a counter, a flag may be used to indicate whether the synchronization information corresponds to the UPSC or not.

Reserved spectrum RS2 in FIG. 4 is exclusively used for the transmission of Proximity Announcements (PAs) by PS enabled UEs. Random Access Channel (RACH) principles may apply to this channel, meaning that the PS UEs will have to wait until they sense that the channel (RS2 spectrum band) is free, before they start transmitting their PAs. This transmission of the PA signals may be performed e.g. in a manner disclosed in EP 2 559 190.

The existence of the universal clock and the two reserved spectrums are applied in order to achieve out of network coverage ProSe discovery. The PS UEs may, for example, be configured to listen to RS1 periodically, where the updated sync packet can be expected. Based on this received packet, the PS UEs can synchronize their Proximity Announcement PA transmissions on RS2 or initiate ProSe communication anywhere in the PS spectrum. Especially for PS UEs that have remained outside of network coverage for a long time and might have lost their synchronization with the UPSC, re-sync can be performed based on the sync packet transmitted in RS1, before attempting to transmit or receive PAs in RS2.

If PS UEs from different PLMNs are used, in order to maintain the inter-operator status of this solution and to ensure that all PS UEs (whether within or out of network coverage) can be synchronized using a common reference clock, the UPSC clock timing can be used, when available, or the most recently updated internal UE timing, in the case that the UPSC is not available (UEs out of network coverage). For this reason, an "Elapsed Time Counter" may be transmitted in RS1 along with the UE's sync information, which contains the elapsed time (e.g. in seconds) since the last time that the PS UE contacted the PS server, and thus updated its internal UPSC information. When the PS UE is within network coverage this counter is set to zero, since the UE is still in periodic contact with the UPSC. It is assumed that the elapsed time starts counting when a period of time $T_0$ has passed since the last contact of the UE with the UPSC, where $T_0$ is larger than the period of regular UPSC updates. This counter serves several purposes, e.g.:

When a PS UE within network coverage (synchronized with the UPSC) and a PS UE out of network coverage (unsynchronized) come within D2D distance of each other, to synchronize among them, using the UPSC timing and not the outdated timing of the out of coverage PS UE When two out of network coverage PS UEs (both unsynchronized) come within D2D distance of each other, to synchronize among them, using the most recently updated UE's information, since its timing has a higher chance of being closer to or the same as the UPSC timing.

This counter also gives a clear guideline which solves ambiguities, as to which UE's timing should be used at any given situation.

The UPSC signal allows the PS UEs to retransmit it when they are on the cell edge or out of network coverage. Moreover, an additional innovation is that the UEs can replace the UPSC synchronization packet with a packet that contains their own synchronization and transmit it, in the case that they are out of network coverage for a long time and they have lost their synchronization with the network.

The synchronization scheme may synchronize PS UEs from different PLMNs even outside of network coverage. The common time reference via the UPSC allows the PS enabled UEs served by the different operators to efficiently synchronize with each other and with the PS enabled UEs temporarily out of coverage in the dedicated PS spectrum domain making the discovery and D2D set-up procedure shorter and 'interference free'. The 'interference free' effect refers to avoiding interference in the PS dedicated spectrum caused by PS enabled UEs within operator's coverage transmitting their synchronization and PA signals out of sync with the SFN and sync reference of the PS enabled UEs that are out-of-coverage of that operator. Note that interference from out-of-sync among different operators (in the case of PS enabled UEs also from UEs with and without operators' network coverage) can result in reduction of system performance in certain cases.

Maintaining the aforementioned GPUL up to date and to enable the ProSe Discovery procedure, three generic algorithmic steps may be taken by the system.

In a first step, a periodic or event triggered update of the GPUL is performed. A periodic update of the GPUL is performed in order to maintain knowledge about the whereabouts of all the PS UEs in all of the operators domains. The PS UEs are configured to periodically communicate with the PS server in order to keep their entries in the GPUL up to date. This procedure is also performed in order to keep the TA/RA/cell/UE coordinates and timestamp fields up to date so that the location and the last seeing of the PS UEs are known to the system. The time interval of the periodic updates can be adjusted by the network operators or by administrators of the public safety server.

Apart from the periodic updates, a PS UE may contact the PS server and update its field in the GPUL at any time, triggered by a specific event or the PS server may request from some or all the PS UEs in its entries to perform an "out of schedule" (non-periodic) update of their fields, again e.g. triggered by a specific event. In the case of the PS UE, this event may be a handover to another cell, a cell reselection, the deactivation of the UE or any other kind of event that would change the information in the PS server fields of the UE in the GPUL. In the case of the PS server, the event could be a trigger from the PS server that an emergency event has occurred, thus making it important to identify all the PS UEs available in the area.

In a second step, a periodic or event triggered calculation of the D2D candidates list is performed.

After the first step of the algorithm is completed and the information in the PS server is updated, the server can identify which of the PS UEs in the GPUL are possible D2D candidates. By analyzing the TA/RA/cell/UE coordinates and timestamp fields the server may identify which PS UEs are in vicinity of each other (D2D range) at a particular time instant (timestamp field). The D2D distance depends on the capabilities (e.g. available transmit power) of each UE and their configuration which can also be included in the GPUL entry. After the calculation, the PS server produces a list of PS UEs that are possible candidates for D2D communication.

Again, this procedure, instead of being a periodic event, may be triggered by specific events, such as a hand-over or a cell reselection of a PS UE, or commands from the PS server. The PS server will be informed about these events either through signaling from the eNB, or directly from the PS UE through the specially established EPS (evolved packet system) bearer.

In a third step, the ProSe discovery procedure may be initiated.

After the second step is completed, the list of candidate D2D UEs is passed along to the one or more operators. The operators in turn, notify the PS UEs on the list, that are camping on their network, that they are in the vicinity of another PS UE and that there is a possibility of D2D communication between them (e.g. LTE direct communication). If the user of the PS UE chooses to pursue the possibility of D2D communication with the other UE or if there is a command for D2D communication between the PS enabled UEs from the PS server, the PS UEs initiate extra proximity measurements to identify if they are in fact within D2D distance of one another and initiate the ProSe discovery procedure. As a result, the PS UEs within proximity of each other will discover each other and will initiate D2D communication.

Additional steps may be performed for optimal functionality of the system and to preserve integrity.

For example, when a PS UE is deactivated (turned-off) it may send a specific "removal from GPUL" request to the PS server. As a result the entry of this specific PS UE will be deleted from the GPUL. In this way, the PS registry will be able to differentiate between the PS UEs that are intentionally deactivated by their users and the PS UEs that are located outside of network coverage and cannot communicate with the PS registry.

Another additional step comprises the out of coverage PS UE registration. In case a PS UE that has an entry in the GPUL fails to perform its periodic update and no "removal from PS registry" request has been sent by this PS UE, the PS server may assume that this PS UE has fallen out of network coverage and updates the corresponding field (Network Coverage field) in its GPUL entry. In this way, the PS server has knowledge of which PS UEs are out of network coverage and when and where they were last seen.

The discoverable PS UEs are configured in such a way that if they fail to perform their periodic update with the PS registry, they assume that they have fallen out of network coverage and initiate periodic "proximity announcements". The proximity announcements are special messages that are sent out in the spectrum reserved for public safety communication, and announce the presence of the UE to other PS UEs in the vicinity. In this way, PS UEs are able to discover each other even outside of network coverage. Proximity announcements can also be transmitted within network coverage, when a UE is informed by the network that it is in vicinity of another PS enabled UE.

Based on the characteristics of the system described above, the ProSe discovery of PS enabled UEs becomes possible, whether the PS UEs are within or out of network coverage and whether they are configured to be discoverable or non-discoverable.

Figure 5:
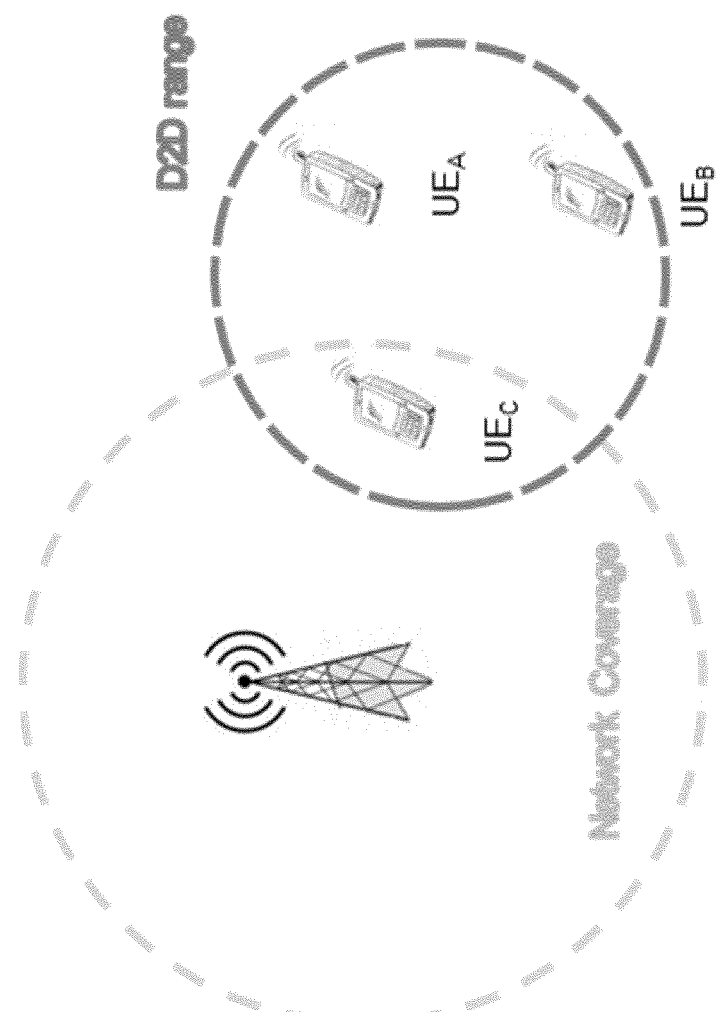
FIGS. 5-11 illustrate various use cases for discovery of PS UEs.

FIG. 5 depicts an example, wherein one or more PS UEs are out of network coverage.

As far as the PS server is concerned, as soon as two or more PS enabled UEs are within D2D range of each other, they will end up in the D2D candidate List. Then, the PS UEs will be informed from their respective operators (or from one operator is both PS UEs are from the same network), that they are in the vicinity of another PS enabled UE. This process may be repeated periodically or upon the occurrence of a specific event (e.g. triggering from the PS server).

From FIG. 5 it can be observed that $UE_C$ is a cell edge UE, while $UE_A$ and $UE_B$ are out of network coverage. Since $UE_A$ and $UE_B$ are out of network coverage, they can no longer perform their periodic update with the PS server. As a result both $UE_A$ and $UE_B$ have been "marked" as out of network coverage in the corresponding field of the GPUL, while $UE_C$ is marked as a cell edge UE, since its experienced RSRP is smaller than the specified threshold. Depending on which of these two categories (cell edge or out of coverage) a UE belongs to, it takes different actions, which can be summarized as follows.

Cell edge PS UE:
If Cell Edge PS UE is Discoverable PS UE:
　Retransmit UPSC sync packet (received from the serving base station) every $x^{th}$ msec of a second in RS1
　Listen to RS2 for PAs
　Transmit PA in RS2
If Cell Edge PS UE is Non-Discoverable PS UE:
　Listen to RS2 for PAs
　If no PAs for time $t>T_1$, then retransmit UPSC sync packet (received from the serving base station) in RS1
　Listen to RS2 for PAs
　Out of network coverage PS UE:
Generic Steps for Both Discoverable and Non-Discoverable PS UE:
　Listen to RS1 for UPSC info and re-sync upon reception of UPSC information
　Listen to RS2 for PAs
Further, if PS UE is Discoverable PS UE:
　Transmit PA in RS2
Further, if PS UE is Non-Discoverable PS UE:
　Don't transmit PA in RS2 but repeat generic steps
Special Case:
　If no UPSC info or PAs received for $t>T_2$
　　Discoverable PS UE: Transmit own synchronization in RS1 and PA in RS2
　　Non-Discoverable PS UE: Wait for $t=T_2+x$ and then transmit own synchronization in RS1 and listen to RS2

The above mentioned actions will lead to the following system behavior, with reference to FIG. 5.

Whenever a discoverable PS UE is on the cell edge, it is notified by the network that it's in the vicinity of the area where some "out of network coverage" PS UE was last seen. That will trigger the cell edge PS UE to retransmit the UPSC sync packet in spectrum RS1 (i.e. the relevant offset from operator's own network SFN and sync clock is received from the network) so that the out of coverage PS UEs can re-sync themselves. After that, the cell edge PS UE will listen to RS2 for PAs. If the out of coverage UEs have received the information on RS1, they should be re-synced and able to transmit their PAs in RS2 at the correct time-synchronized moments. If the cell edge UE has not received any PAs in the RS2 then it sends out its own PA. This process continues periodically until the cell edge PS UE discovers the out of network coverage UEs or it is instructed by the PS server to terminate this procedure (e.g. it is no longer within D2D range of the last sighting of the "out of network coverage" UE).

If the cell edge PS UE is configured to be non-discoverable, then an alternative process is used instead because the PS UE is not allowed to identify itself. The cell edge PS UE will be informed by the network in the same way as before about its vicinity to an area where some out of coverage UEs were last seen. Since the cell edge PS UE does not want to be discovered, initially it will not transmit anything (neither UPSC info nor PAs) but it will monitor RS2. If the out of coverage PS UEs are still in sync and they are transmitting PAs, the cell edge PS UE will be able to discover them. If a significant period of time has passed ($t>T_1$) and the cell edge UE has not discovered other PS UEs, it determines that the out of coverage UEs have lost their synchronization. In that case, the cell edge UE will initiate retransmission of the UPSC sync packet in RS1, and continue to monitor RS2, without transmitting any PAs in RS2. In that way, the out of coverage PS UEs can receive the UPSC info and re-sync themselves and be able to start transmitting their PAs in RS2, so the non-discoverable cell edge UE can discover them. By retransmitting the UPSC sync packet the cell edge UE makes its presence known but it still remains undiscovered as its identity is not revealed. The UPSC sync packet contains only generic synchronization information (and possibly an elapsed time counter or flag as described above), and no information whatsoever about the UE that sent it. So the out of network coverage PS UEs will know that there is another PS UE out there (information which they can be configured not to share with the user) since they received a UPSC sync packet while out of coverage, but they will have no information about the UE identity and cannot exchange data with this PS UE. This is a worst case scenario solution, which will only be used when the out of coverage UEs have remained out of coverage for so long that they have lost their synchronization, and it still preserves the anonymity and thus the non-discoverable status of the cell edge UE.

In the case that a PS enabled UE is out of network coverage (failure to contact the PS server) it will start monitoring RS1 for the UPSC sync packet and RS2 for PAs from other PS enabled UEs.

If the PS UE is configured to be discoverable it will also transmit its PAs in RS2 based on its own synchronization which corresponds to the UPSC clock if it is not out of network coverage for too long.

If the PS UE is configured to be non-discoverable then it will not transmit anything and will just continue monitoring both reserved spectrum bands (RS1 and RS2) within the public safety spectrum. In this way non-discoverable PS UEs will not be discovered even when out of network coverage but they will be able to discover other PS enabled UEs in vicinity within or out of network coverage.

In the case that some PS UEs are out of network coverage for a long period of time and they have lost their synchronization with the UPSC, they could be transmitting their PAs in RS2, but due to failed synchronization they would not discover each other. For this reason a special solution has been considered.

If the out of coverage PS UE is configured to be discoverable then it will follow the aforementioned procedure for a time $t=T_2$. If after time $T_2$ it has not received a sync packet or a PA from another PS UE, then it will start transmitting its own synchronization information in RS1. In this way, if another PS enabled UE is in its vicinity, it will receive this information in RS1 and sync itself to the timing of the transmitting UE, and as a result these two PS UEs will be able to have synchronized transmission of their PAs in RS2 which will lead to mutual discovery.

A non-discoverable UE will follow the same process but it will wait for time $t=T_2 \times$ before starting to transmit its own synchronization information in RS1, thus making it more probable that discoverable UEs "reveal" themselves before non-discoverable UEs do. As in the cell edge scenario, this is a worst case scenario solution which will only be implemented in rare cases and which still allow for the non-discoverable UE to not be explicitly detected, but it will give away the fact that some UE is in the vicinity, with no further information about its identity.

The various time parameters ($T_1$, $T_2$ and x) can be pre-configured into the PS enabled UEs or they can be adjusted by the PS server. For instance, in non-urgent situations their values can be larger, thus making more probable the fact that the presence of non-discoverable UEs will not be detected at all, while in case of emergency these values can be smaller, thus ensuring quick discovery among PS enabled UEs.

Various use cases will be described below. In these cases, each of the PS UEs can be in or out of the network coverage of the public safety spectrum. In each of the use case, PS $UE_C$ is registered in the PS server as a non-discoverable PS UE, whereas PS $UE_A$ and PS $UE_B$ are registered as discoverable PS UEs (i.e. these PS UEs are enabled to transmit their identity).

A first use case is described with reference to FIG. 6. In this use case, non-discoverable PS $UE_C$ is within network coverage of the PS spectrum, while PS $UE_A$ and PS $UE_B$ are out of network coverage.

Figure 6:
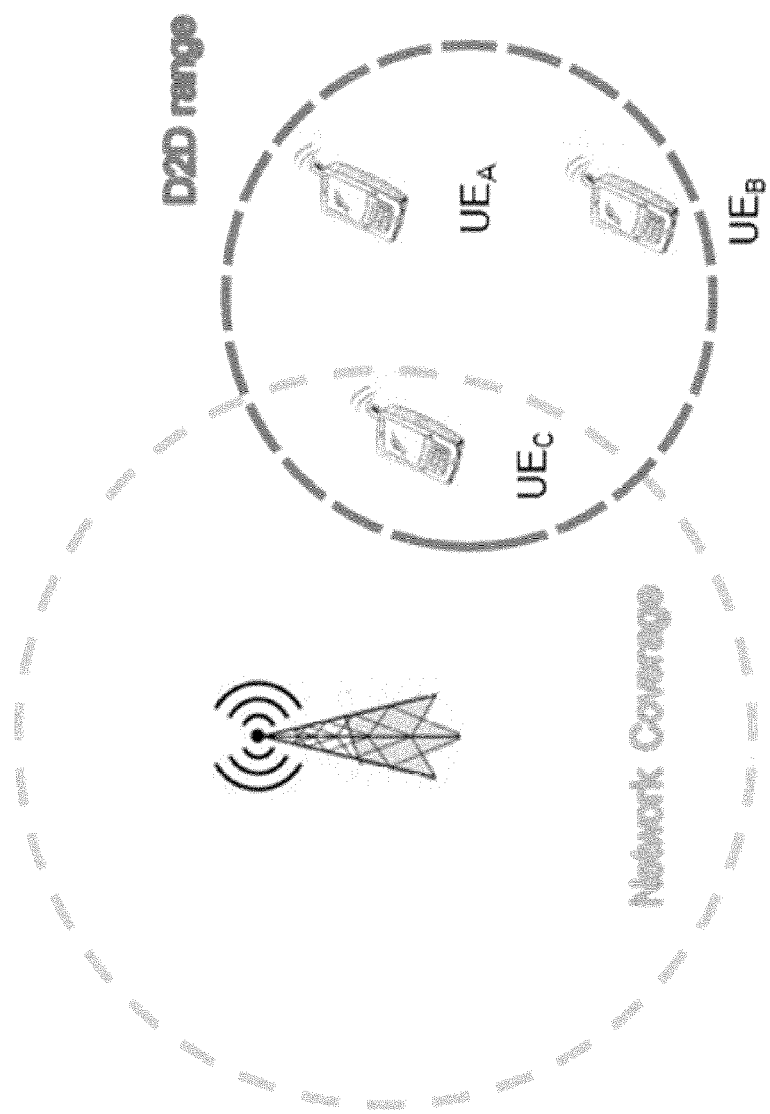

In the use case of FIG. 6, the following events happen:
PS $UE_A$ and PS $UE_B$ fail to perform their periodic update with the PS server and they are marked "out of coverage". They both start listening to RS1 and transmit PAs in RS2;
$UE_C$ is marked as "cell edge" in the PS server;
The PS server calculates that PS $UE_C$ is in the vicinity of the area where PS $UE_A$ and PS $UE_B$ were last seen and it informs $UE_C$;
PS $UE_C$ monitors RS2 for Pas, but does not retransmit the UPSC sync packet in RS1;
All UEs are within D2D range of each other, so they can all receive the Pas being sent out;
$UE_A$ receives the proximity announcement of $UE_B$ and discovers it;
$UE_B$ receives the proximity announcements of $UE_A$ and discovers it;
$UE_C$ receives the proximity announcements of $UE_A$ and $UE_B$ and discovers them;
$UE_A$ and $UE_B$ do not discover $UE_C$ since it is not sending out proximity announcements In the case that $UE_A$ and $UE_B$ have lost their synchronization, due to prolonged stay outside of network coverage, PS $UE_C$ will eventually retransmit the UPSC sync packet (SFN and sync clock offsets received from its currently serving eNB) after time $T_1$, as described above. After the re-synchronization of PS $UE_A$ and PS $UE_B$, the same events will occur as described above.

Figure 7:
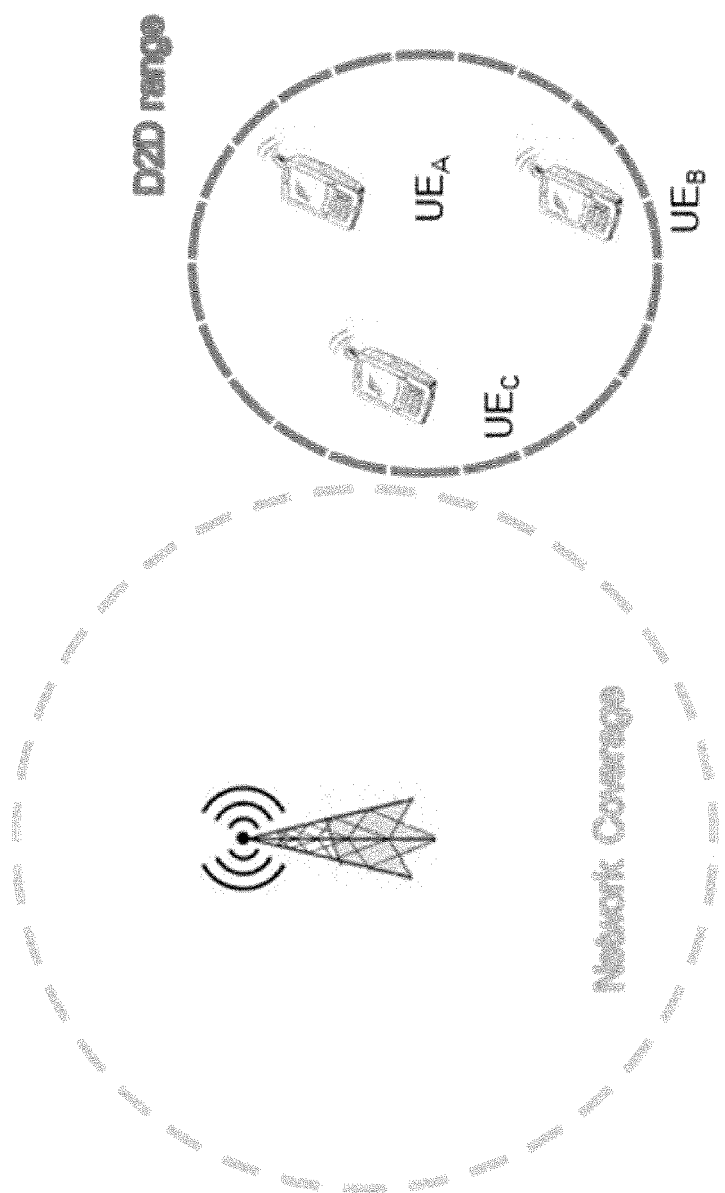

FIG. 7 is an illustration of a use case, wherein all PS UEs are out of network coverage. In this use case, the following events may occur:
PS $UE_A$, PS $UE_B$ and PS $UE_C$ all have been marked "out of network coverage" due to inability to perform periodic update with the PS server;
PS $UE_A$ and PS $UE_B$ start transmitting PAs in RS2 and listening to RS1;
PS $UE_C$ monitors RS1 and RS2 without transmitting anything;
All PS UEs are within D2D range of each other, so they can all receive the proximity announcements PA being sent out;
$UE_A$ receives the proximity announcement of $UE_B$ and discovers it;
$UE_B$ receives the proximity announcements of $UE_A$ and discovers it;
$UE_C$ receives the proximity announcements of $UE_A$ and $UE_B$ and discovers them;
$UE_A$ and $UE_B$ do not discover $UE_C$ since it is not sending out proximity announcements;

In the case that PS $UE_A$, PS $UE_B$ and PS $UE_C$ have lost their synchronization, due to prolonged stay outside of network coverage of the PS spectrum, the procedure that was described in the use case of FIG. 6 will be followed, where the PS UEs will start transmitting their own synchronization in RS1 after time $T_2$ has elapsed ($[T_2+x]$ for PS $UE_C$). That will result in all of the UEs synchronizing among themselves (using the sync time of the UE that transmitted first) and the same events as described above will occur.

In the use case of FIG. 7, two special cases have been envisioned, wherein additional steps are performed and in which an Elapsed Time Counter is used. These cases are treated separately below with reference to FIGS. 8 and 9.

Figure 8:
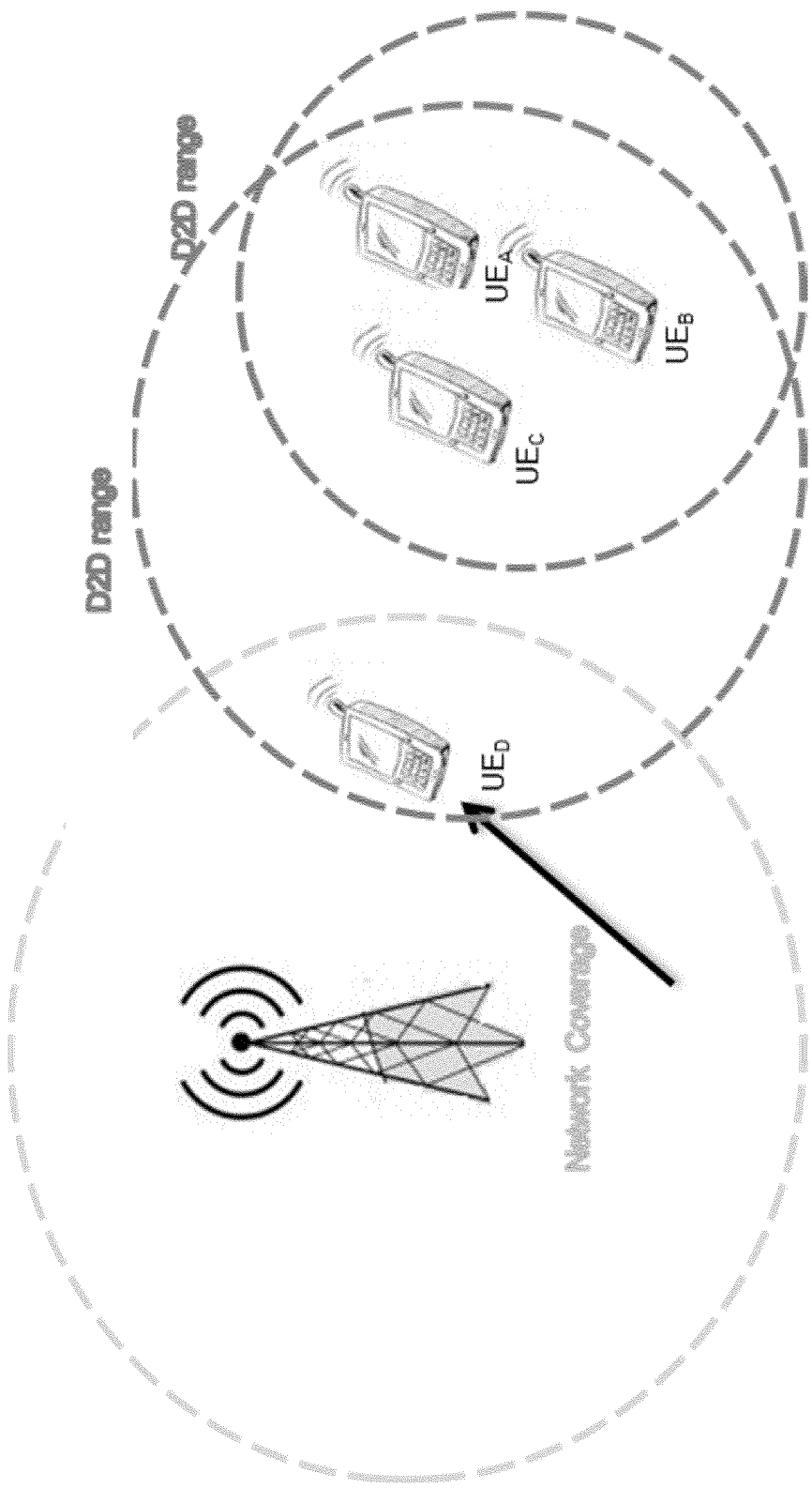

This case of FIG. 8 is based on the layout of use case of FIG. 7 and considers the case that a PS $UE_D$, set to be discoverable, within network coverage, will approach and come into D2D distance from the already formed cluster of out of network coverage PS UEs, communicating using LTE-Direct over the PS spectrum. In this case, the PS UE form a new cluster by synchronizing to the timing of PS $UE_D$, since that is the PS UE with the correct updated timing (UPSC).

In the situation of FIG. 8, the following events happen:
PS $UE_A$, PS $UE_B$ and PS $UE_C$ all have been marked "out of network coverage" due to inability to perform periodic update with the PS registry;
PS $UE_A$, PS $UE_B$ and PS $UE_C$ are assumed to be out of network coverage long enough to have lost synchronization with the UPSC;
By using RS1 and RS2 as described with reference to FIG. 7, all the PS UEs synchronize and discover each other by using the timing of the PS UE with the smallest "Elapsed Time Counter";

PS UE$_A$, PS UE$_B$ and PS UE$_C$ have discovered each other and are engaging in ProSe communication;

PS UE$_D$ comes into D2D range from the out of network coverage cluster;

PS UE$_D$ is marked as "cell edge UE" and starts transmitting its sync packet in RS1, containing the UPSC information and its 'Elapsed Time Counter" which is zero, since it is still within network coverage;

PS UE$_A$, PS UE$_B$ and PS UE$_C$ receive the sync packet of PS UE$_D$ and become aware that PS UE$_D$ has more recently updated UPSC info;

All PS UEs re-sync using the information of the sync packet of PS UE$_D$;

After re-syncing all PS UEs (including PS UE$_D$) re-discover and start communicating with each other, as previously described The above steps ensure that the UPSC information is always used for D2D synchronization, when available, thus making sure that all PS UEs will have a common timing reference when possible.

Figure 9:
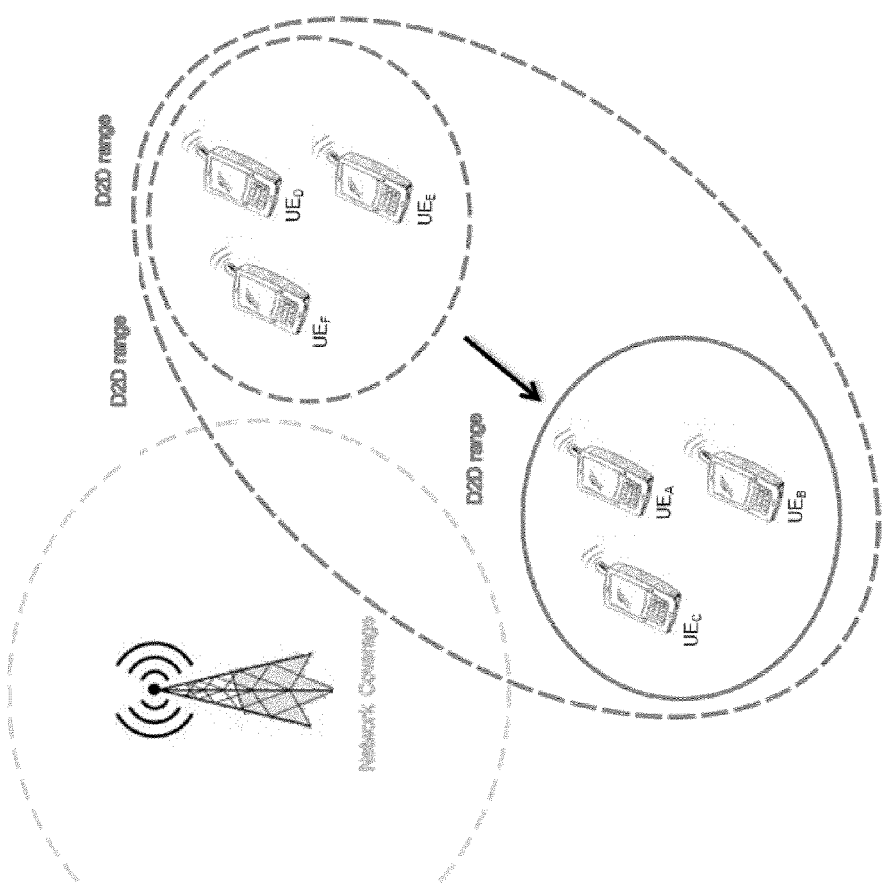

In the case of FIG. 9, an already formed cluster of out of network coverage PS UEs approaches and comes into D2D distance of another already formed cluster of out of network coverage PS UEs. The PS UEs of both clusters are communicating among each other using ProSe communication, and are synchronized based on different clocks, since they are both assumed to be out of sync with the UPSC.

The following events may happen:

All PS UEs have been marked "out of network coverage" due to inability to perform periodic update with the PS registry;

All PS UEs are assumed to be out of network coverage long enough to lose synchronization with the UPSC;

PS UE$_A$, PS UE$_B$ and PS UE$_C$ are synchronized using timing $t_1 \neq$ UPSC. PS UE$_D$, PS UE$_E$ and PS UE$_F$ are synchronized using timing $t_2 \neq$ UPSC. Moreover, $t_1 \neq t_2$;

From the transmission of sync packets in RS1 and PAs in RS2, all PS UEs become aware that there are now more PS enabled UEs in D2D range;

All PS UEs re-sync using the timing of the PS UE with the smallest "Elapsed Time Counter" in its sync packet;

After re-syncing all PS UEs re-discover and start communicating with each other, as previously described;

These steps clarify which PS UE timing should be used when all available PS UEs are out of sync with the UPSC, which speeds up the synchronization and discovery process. The probability is increased that the PS UEs will be synchronized with the UPSC, since the most recently updated PS UE, could still be in sync with the UPSC.

Figure 10:
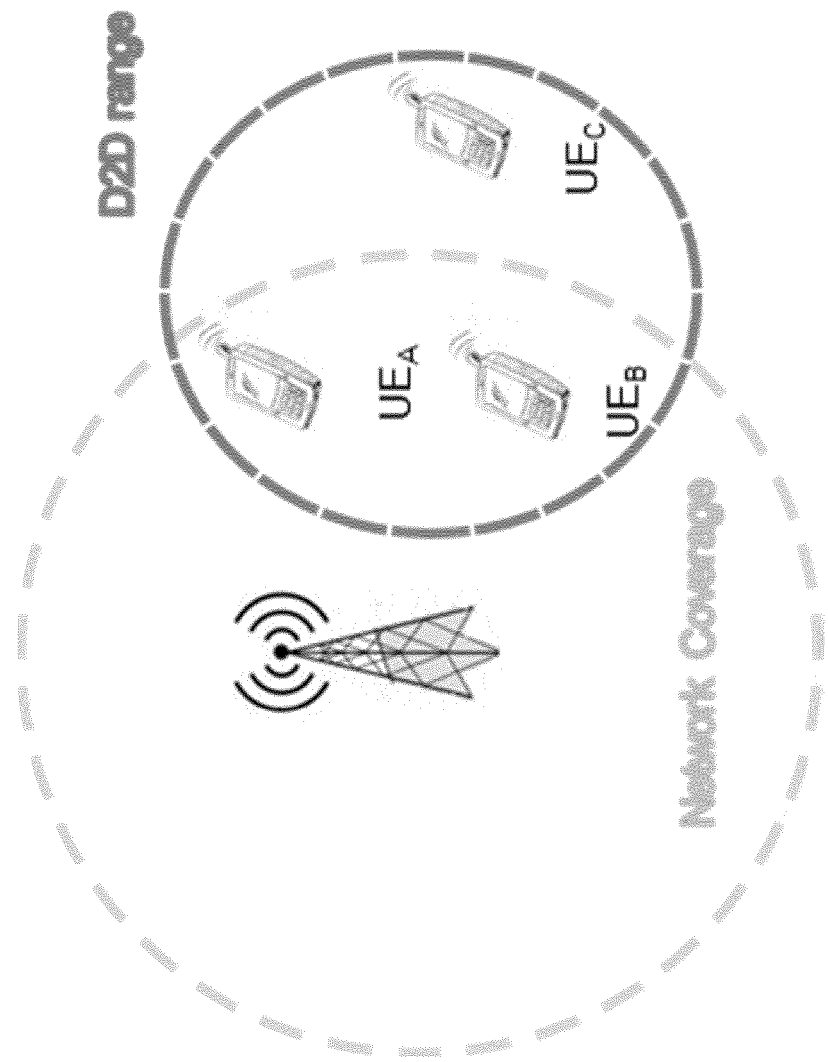

In the use case of FIG. 10, PS UE$_C$ that is configured to be non-discoverable, is located out of network coverage while PS UE$_A$ and PS UE$_B$ that are configured to be discoverable are within network coverage.

In the case the following events happen:

PS UE$_A$ and PS UE$_B$ are marked as "cell edge" and they are informed by the PS server that they are in the area where PS UE$_C$ was last seen;

PS UE$_A$ and PS UE$_B$ initiate UPSC sync packet retransmission in RS1 and PA transmission in RS2 (since they are configured to be discoverable);

PS UE$_C$ is marked as "out of network coverage" due to inability to perform periodic update with the PS server;

PS UE$_C$ does not transmit PAs in RS2 because it is configured to be non-discoverable;

All PS UEs are within D2D range of each other, so they can all receive the proximity announcements being sent out;

PS UE$_C$ monitors RS1 and RS2 and receives the re-sync information and PAs respectively;

PS UE$_A$ receives the proximity announcement of PS UE$_B$ and discovers it;

PS UE$_B$ receives the proximity announcements of PS UE$_A$ and discovers it;

PS UE$_C$ receives the proximity announcements of PS UE$_A$ and PS UE$_B$ and discovers them;

PS UE$_A$ and PS UE$_B$ do not discover UE$_C$ since it is not sending out proximity announcements If PS UE$_C$ has been out of coverage for a long time it can be initially out-of sync for the synchronization packets in RS1 and the corresponding PA transmissions in RS2. If this is the case then UE$_C$ will scan (periodically) RS1 for the synchronization packets retransmitted by the "cell edge" users PS UE$_A$ and PS UE$_B$ and regain the synchronization, which in turns enables PS UE$_C$ to also capture the PA transmissions in RS2 and discover PS UE$_A$ and PS UE$_B$.

PS UEs may belong to different PLMNs. Each PLMN has its own synchronization references. PS UEs belonging to different PLMNs will generally not have a synchronized time slots where they can send/receive discovery information.

Figure 11:
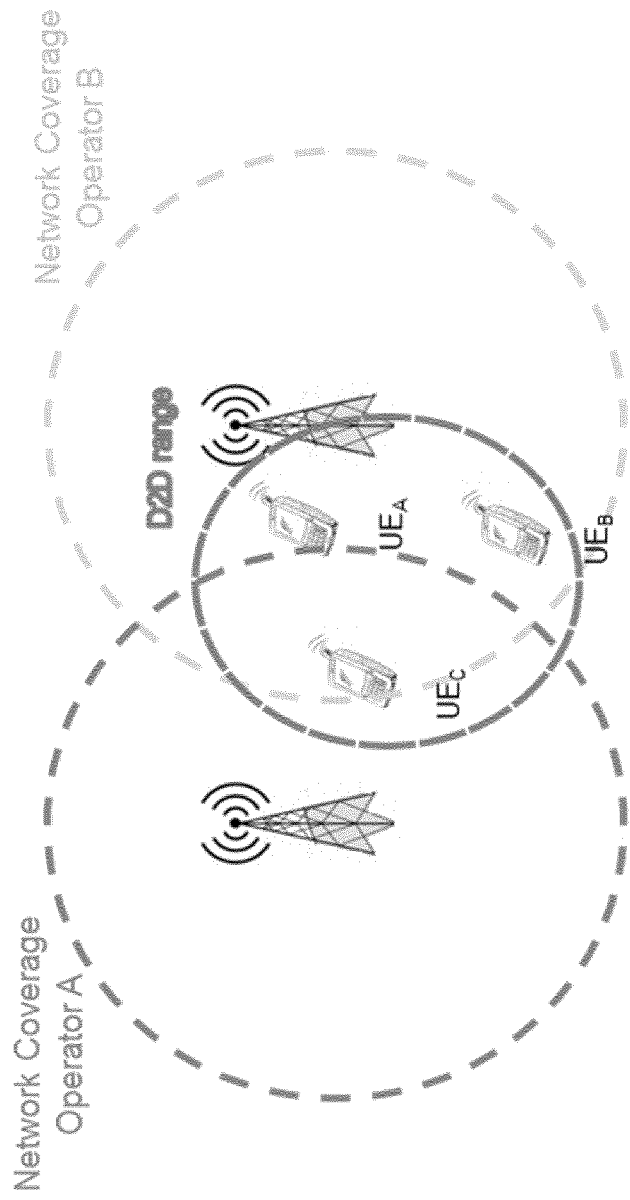

In the use case of FIG. 11, all the PS UE are located within network coverage of the PS spectrum but belong to different operator's. UE$_A$ and UE$_B$ belong to operator's B PLMN while UE$_C$ belongs to operator's A PLMN.

In the case of FIG. 11, the following events happen:

None of the PS UEs is marked as cell-edge or out of network coverage;

All the PS UEs are synchronized with the PS server through the UPSC signal;

Based on their location information, the PS server calculates and informs all three PS UEs that they are within D2D range of each other;

PS UE$_A$ and PS UE$_B$ initiate PA transmission in RS2 (since they are configured to be discoverable);

PS UE$_C$ does not transmit PAs in RS2 because it is configured to be non-discoverable;

All PS UEs are within D2D range of each other, so they can all receive the proximity announcements being sent out;

PS UE$_C$ monitors RS2 for transmitted PAs;

PS UE$_A$ receives the proximity announcement of UE$_B$ and discovers it;

PS UE$_B$ receives the proximity announcements of UE$_A$ and discovers it;

PS UE$_C$ receives the proximity announcements of PS UE$_A$ and PS UE$_B$ and discovers them;

PS UE$_A$ and PS UE$_B$ do not discover PS UE$_C$ since it is not sending out proximity announcements;

It should be noted that, while in the above embodiments different bands RS1 and RS2 have been respectively applied for the transmission of synchronization information and PAs, a single band may also be applied. In such a case, interference reducing or eliminating measures may be applied.

It should be noted that, while the previous disclosure focuses on public safety spectrum and PS UEs, the presented approach may also be applied for non-public safety UEs within the non-PS part of the spectrum. Also in non-public safety cases, UE and other portable devices may be set as or configured as non-discoverable.

It is noted that the method has been described in terms of steps to be performed, but it is not to be construed that the steps described must be performed in the exact order described and/or one after another. One skilled in the art may envision to change the order of the steps and/or to perform steps in parallel to achieve equivalent technical results.

With some modifications, one skilled in the art may extend the embodiments described herein to other architectures, networks, or technologies.

Various embodiments of the invention may be implemented as a program product for use with a computer system or a processor, where the program(s) of the program product define functions of the embodiments (including the methods described herein). In one embodiment, the program(s) can be contained on a variety of non-transitory computer-readable storage media (generally referred to as "storage"), where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored.

It is to be understood that any feature described in relation to any one embodiment may be used alone, or in combination with other features described, and may also be used in combination with one or more features of any other of the embodiments, or any combination of any other of the embodiments. Moreover, the invention is not limited to the embodiments described above, which may be varied within the scope of the accompanying claims.

The invention claimed is:

1. A method, comprising:
    transmitting, by a first public safety user equipment (PS UE), synchronization information for a discoverable second PS UE; and
    receiving, at the first PS UE, at least one proximity announcement (PA) in accordance with the synchronization information, wherein the synchronization information comprises an indication of freshness of the synchronization information indicating an elapsed time since a last contact with and update of PS server clock timing information of the first PS UE with a PS server, when at least one of the first PS UE and the second PS UE are out of network coverage and have lost synchronization with the PS server and the first PS UE and the second PS UE are within a predetermined distance of each other.

2. The method according to claim 1, wherein the first PS UE is a non-discoverable PS UE, and wherein the method further comprises:
    delaying, by the first PS UE, transmission of the synchronization information for a first pre-defined time period;
    monitoring, by the first PS UE, reception of at least one of a PA and synchronization information from the discoverable second PS UE during the first pre-defined time period; and
    transmitting, by the first PS UE, the synchronization information for the second PS UE only if the at least one of a PA and the synchronization information has not been received during the first pre-defined time period.

3. The method according to claim 1, wherein the first PS UE is inside network coverage of public safety spectrum of a telecommunications network, wherein the discoverable second PS UE is outside the network coverage, and wherein the method further comprises:
    receiving, at the first PS UE, synchronization information from the telecommunications network; and
    transmitting, by the first PS UE, the synchronization information for the second PS UE, the synchronization information for the second PS UE based on the synchronization information received from the telecommunications network.

4. The method according to claim 3, further comprising:
    receiving, at the first PS UE, a trigger from the telecommunications network of the discoverable second PS UE; and
    transmitting, by the first PS UE, the synchronization information only when the trigger has been received.

5. The method according to claim 1, wherein the first PS UE is outside the network coverage of the public safety spectrum of the telecommunications network, and wherein the method further comprises:
    delaying, by the first PS UE, transmission of the synchronization information for a second pre-defined time period;
    monitoring, by the first PS UE, synchronization information from the discoverable second PS UE during the second pre-defined time period
    transmitting after expiration of the second pre-defined time period, by the first PS UE, synchronization information that comprises synchronization information from the first PS UE; and
    receiving, at the first PS UE, the at least one PA in accordance with the synchronization information from the first PS UE.

6. The method according to claim 5, wherein the first pre-defined time period is shorter than the second predefined time period.

7. The method according to claim 5, further comprising:
    receiving, at the first PS UE, second synchronization information from a third PS UE, wherein the second synchronization information comprises a second indication of freshness; and
    adapting, at the first PS UE, synchronization in accordance with the second synchronization information to receive the at least one PA from the third PS UE when the second indication of freshness indicates that the second synchronization information is more recent than currently applied synchronization information.

8. The method according to claim 7, wherein the second indication of freshness comprises at least one of an elapsed time field and a flag.

9. The method according to claim 3, wherein the discoverable second PS UE is within the network coverage of the public safety spectrum of the telecommunications network, and wherein the synchronization information is received from the discoverable second PS UE and is based on the synchronization information received from the telecommunications network.

10. The method according claim 1, wherein the synchronization information is transmitted in a first reserved spectrum band of the public safety spectrum and the PA is received in a second reserved spectrum band, different from the first spectrum band, of the public safety spectrum.

11. A non-transitory computer program medium comprising a computer program with software code that, when executed on a computer system, causes the computer system to perform the method according to claim 1.

12. A public safety user device configured with the non-transitory computer program medium according to claim 11.

* * * * *